INVENTORS
ERNST GAEUMANN AND
VLADIMIR PRELOG
BY.

ATTORNEYS

United States Patent Office 3,131,127
Patented Apr. 28, 1964

3,131,127
ANTIBIOTIC ANGOLAMYCIN AND METHOD
OF PRODUCTION
Ernst Gaeumann and Vladimir Prelog, Zurich, Switzerland, assignors to Ciba Corporation, a corporation of Delaware
Filed June 8, 1961, Ser. No. 115,736
Claims priority, application Switzerland June 10, 1955
14 Claims. (Cl. 167—65)

This invention provides a new crystalline antibiotic substance, which is referred to hereinafter as "angolamycin," and salts thereof, pharmaceutical preparations containing these compounds, and a process for the manufacture of these substances and mixtures of substances.

Figure 1:
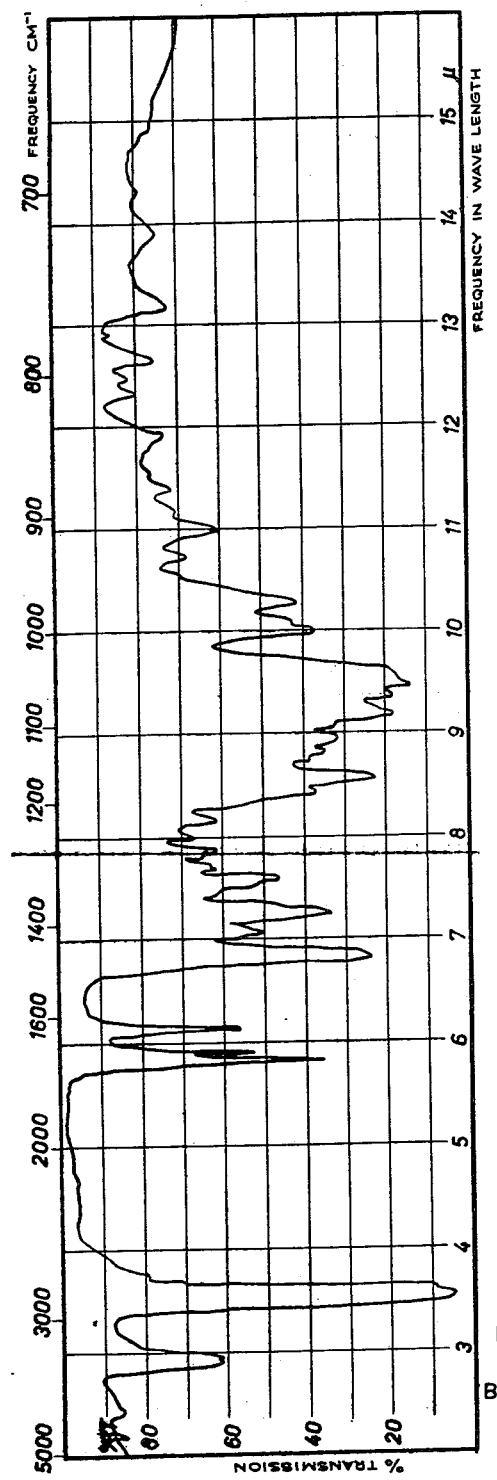

Angolamycin is a base and crystallizes from a mixture of benzene and ether in the form of colorless crystals which melt at 133–136° C. From certain solvents, for example, diisopropyl ether or dioxane, angolamycin crystallizes in a second needle-shaped crystalline modification melting at 165–168° C. According to elementary analysis it has the empirical formula $C_{50+1}H_{89\pm2}O_{18}N$. It has been deduced from this formula that angolamycin contains three methoxy groups, two N-methyl groups, and at least eight C-methyl groups determined by the method of Kuhn-Roth, and also five active hydrogen atoms (Zerewitinoff). Angolamycin is optically active having the specific rotation $[\alpha]_D^{21}=-64°$ (c.=1.30 in chloroform), and exhibits in ultraviolet light a strong band at 240 m$\mu$ (log $\epsilon$=4.16 in ethanol). In the infra-red spectrum (cf. FIG. 1), when taken up in mineral oil, it exhibits bands at 2.93$\mu$, 3.53$\mu$ (mineral oil), 5.84$\mu$, 5.92$\mu$, 6.15$\mu$ 6.81$\mu$, (mineral oil), 7.06$\mu$, 7.25$\mu$ (mineral oil), 7.59$\mu$, 7.69$\mu$, 7.87$\mu$, 8.00$\mu$, 8.16$\mu$, 8.44$\mu$, 8.56$\mu$, 8.95$\mu$, 9.16$\mu$, 9.27$\mu$, 9.34$\mu$, 10.02$\mu$, 10.29$\mu$, 10.70$\mu$, 11.00$\mu$, 11.38$\mu$, 11.91$\mu$, 12.32$\mu$, 12.66$\mu$, 13.20$\mu$ and 13.90$\mu$ (mineral oil). When dissolved in methyl-Cellosolve-water (80:20) angolamycin exhibits a pK-value of 6.74. When hydrogenated in ethanol with a palladium-calcium carbonate catalyst it takes up one molecular proportion of hydrogen, whereas in glacial acetic acid with a platinum oxide catalyst three molecular proportions of hydrogen are consumed.

Figure 2:
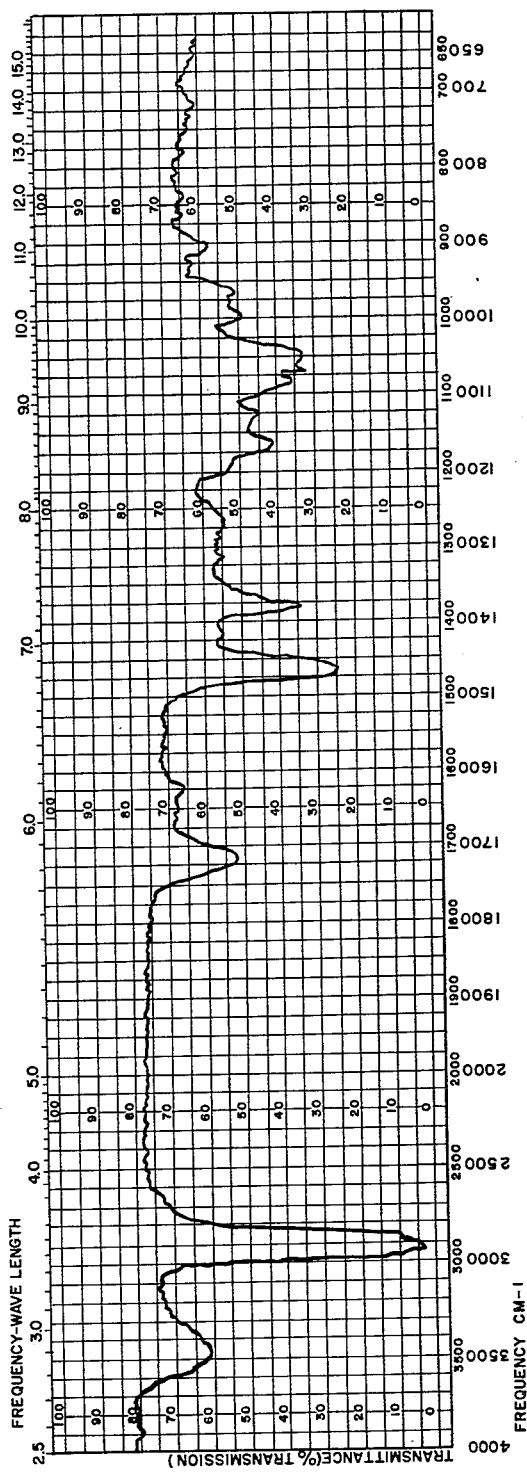
Figure 3:
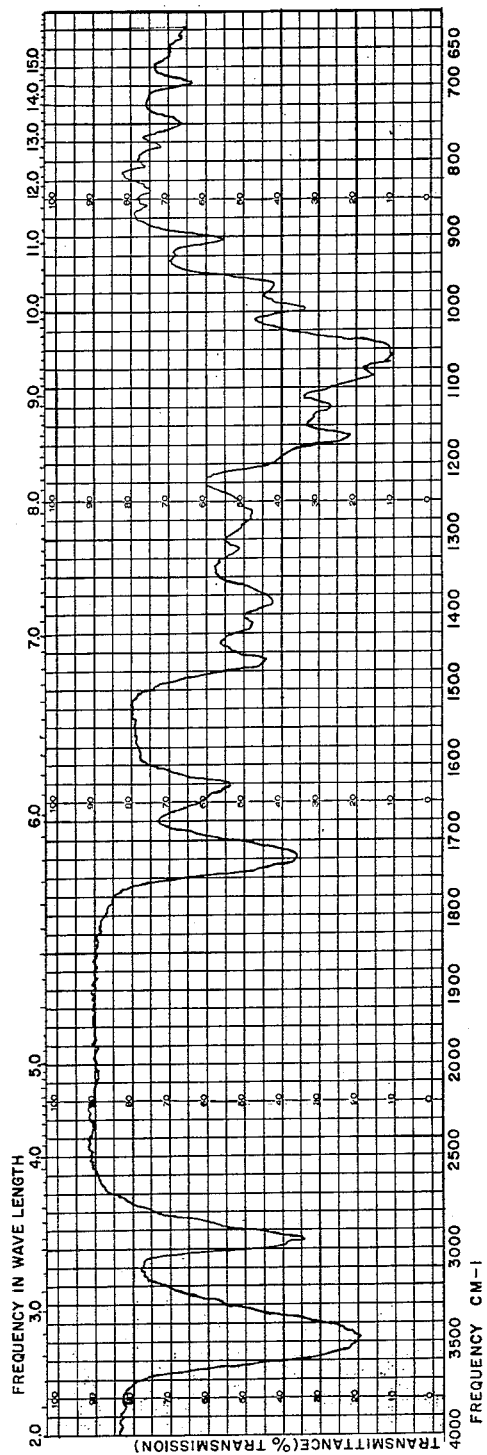

The dihydro-angolamycin, crystallized from isopropyl-ether, melts at 124–126° C. FIG. 2 shows the infra-red spectrum of this compound in heavy paraffin oil, FIG. 3 its infra-red spectrum in potassium bromide.

Angolamycin with respect to its physical constants has a certain similarity to carbomycin and erythromycin. It can easily be distinguished from carbomycin by the color reactions of Fischbach and Levine ("Antibiotics and Chemotherapy," vol. 3, page 1159 [1953]). In these tests angolamycin gives at first a dirty yellow and later a brown coloration, whereas carbomycin under the same conditions gives a violet to purple coloration.

It differs from erythromycin, not only in its ultraviolet absorption characteristics, but also in its behavior in paper chromatography. In the solvent system methanol (19 parts by volume)-acetone (6 parts by volume)-water (75 parts by volume) the following $R_f$-values are obtained: Angolamycin=0.78 and erythromycin=0.86. A further distinction between angolamycin and erythromycin is found in the hydrolysis of these antibiotics with dilute mineral acids. The resulting fission products are an aglycone and two reducing substances which are sugars, none of which is identical with the hydrolysis product desosamine of erythromycin and other antibiotics as chromatography shows.

The salts of angolamycin are derived from known inorganic and organic acids, for example, hydrochloric acid, sulfuric acids, acetic acid, valeric acid, palmitic acid or oleic acid, succinic acid, citric acid, mandelic acid, glutamic acid or pantothenic acid. They are neutral or acid salts. They are made by the action of the acid on the free base or by double decomposition between salts, for example, between angolamycin sulfate and sodium pantothenate.

Angolamycin possesses an antibiotic action with respect to various test organisms. By using as test methods for bacteria in vitro a series of dilutions of the substance (to the power of 10) in glucose bouillon and for amoeba dilution series in Bacto-Entamoeba medium incubated for 24 hours at 37° C. the following concentrations still gave growth inhibition.

Inhibiting concentration, $\mu$grams per cubic centimeter

Test organism:
  Bacillus megatherium _____ 0.1–1
  Streptococcus pyogenes _____ 10
  Micrococcus pyogenes var. aureus _____ 10–100
  Micrococcus pyogenes var. aureus (penicillin resistant) _____ 10–100
  Corynebacterium diphtheriae _____ 100
  Entamoeba histolytica _____ 10–100

Angolamycin is not active in vitro at a concentration of 100 $\mu$grams per cc. against the following microorganisms: Streptococcus mitis, Streptococcus faecalis, Escherichia coli, Salmonella typhosa, Salmonella schottmuelleri, Shigella sonnei, Pseudomonas aeruginosa, Klebsiella pneumoniae (Type A), Pasteurella pestis, Vibrio comma (El Tor), Mycobacterium tuberculosis (H 37 Rv), Candida albicans and Candida tropicalis.

Angolamycin is also active in vivo. When mice infected with Streptococcus pyogenes are given 10×50 mg./kg. S.C. 100 percent still survive on the 6th day and 67 percent survive on the 10th day.

The toxicity of angolamycin is low: Mice tolerate without harm a single subcutaneous injection of 500 mg./kg.

Angolamycin can therefore be used in medicine as a medicament against infections caused by the above mentioned microorganisms.

The antibiotic angolamycin is obtained by the culture of a new species of Actinomycetes of the genus Streptomyces, which is not identical with any of the species mentioned in Bergey's "Manual of Determinative Bacteriology," 6th edition, or in "Actinomycetes and Their Antibiotics," of Waksman and Lechevalier, 1953, and which is hereinafter referred to as "Streptomyces eurythermus." Up to now it has been isolated three times, namely from samples of soil collected in Cuanza (Angola), in Kisantu (Congo) and at Regensberg (Switzerland). All these three strains produce the new antibiotic and conform with one another morphologically and physiologically except for trifling differences. They are kept in our laboratory and in the Eidg. Technischen Hochschule, Institut fuer spezielle Botanik, Zurich, under the designations A 6677, A 6905 and A 7489 and at the United States Department of Agriculture, Northern Regional Research Laboratories, Peoria, under the designations NRRL 2539, 2540 and 2541, respectively.

Streptomyces eurythermus produces an almost all nutrient media a substratum mycelium consisting of long hyphae and a dark brown diffusing pigment. Its air mycelium is dense and generally grey, and has individual conidial chains not combined into tufts. The latter is a typical characteristic of the genus Streptomyces. The individual conidiae are oval to globular and smooth, and their size is about 0.8–1$\mu$×0.6–0.7$\mu$. Growth is relatively little dependent on temperature, the mould developing well at 18° C., although the optimum is between 25° C. and 32° C.

For the purpose of further identification the growth of

*Streptomyces eurythermus* on various nutrient media is described below. The nutrient media Nos. 1 to 8 and 12 were prepared according to W. Lindenbein, Arch, Mikrobiol., vol. 17, page 361 (1952).

(1) Synthetic agar: Growth pustular and pale brown; air mycelium scanty and initially white-grey and later ash grey; pigment brown. Strain NRRL 2541 forms an abundant dense velvety ash-grey air mycelium.

(2) Synthetic solution: Submerged growth, flocks and sediment, pale brown; pigment brown.

(3) Glucose bouillon: Growth scanty, sediment pustular and brownish yellow.

(4) Glucose agar: Growth cushion-like to wrinkled and pale brown; air mycelium velvety white grey to greenish grey; pigment chestnut brown.

(5) Glucose-asparagin-agar: Growth thin and cloud-like and white yellow; air mycelium velvety and white grey to ash grey; pigment chestnut brown. The air mycelium from strain NRRL 2541 is light pink at the surface.

(6) Calcium malate-agar: Growth lichen-like and pale brown; air mycelium dusty and ash grey; pigment dark brown. The air mycelium from strain NRRL 2540 is brownish grey.

(7) Gelatine stab culture of 18° C.: Growth very scanty; pigment dark brown. Liquefaction in the case of strain NRRL 2539 weak after 40 days, in the case of strain NRRL 2540 strong (2.2 cm.) after 34 days, and in the case of strain NRRL 2541 strong (2.0 cm.) after 31 days.

(8) Starch plate: Growth pustular and gold-yellow; air mycelium velvety and initially snow white and later grey; pigment pale brown; starch hydrolysis equals 0.5 to 0.8 cm. after 4 days.

(9) Nutrient agar: Growth pustular and brownish yellow; air mycelium velvety and ash grey; pigment reddish brown. Strain NRRL 2541 formed no air mycelium.

(10) Potato: Growth lichen-like and pale brown; air mycelium velvety and initially milk white and then ash grey; pigment brownish to pitch black.

(11) Carrot: Growth pustular and brownish yellow; air mycelium velvety and chalk white to grey in the case of strain NRRL 2539 and white grey to pink in the case of strains NRRL 2540 and NRRL 2541; pigment pitch black.

(12) Litmus milk (Difco No. B 107): Growth ring-like, brown and subsequent surface growth; air mycelium ash grey; pigment dark brown; peptonization with coagulation; litmus slightly reddish.

*Streptomyces eurythermus* differs from other known thermophilic species of the genus Streptomyces in the following respects.

From *S. thermophilus* (Gilbert) Waksman and Henrici by its well developed air mycelium, by its strong pigment formation on gelatine and nutrient agar, and also by the color of the pigment.

From *S. thermodiastaticus* (Bergey) Waksman and Lechevalier by the color of its air mycelium and the pigment formation.

From *S. thermofuscus* (Waksman, Umbreit and Cordon) Waksman and Henrici by the color of its air mycelium and the pigment formation on gelatine.

From *S. casei* (Bernstein and Morton) Waksman and Lechevalier by the color of its air mycelium, the pigment formation and the hydrolysis of starch.

Among the mesophilic Streptomycetes, *Streptomyces eurythermus* resembles most closely *S. antibioticus* (Waksman and Woodruff) Waksman and Henrici, but its growth on potatoes, carrots and milk is clearly different.

*Streptomyces eurythermus*, when its growth is investigated by the technique of T. G. Pridham and D. Gottlieb, Journal of Bacteriology, volume 56, page 107 (1948) with the use of various sources of carbon behaves as follows:

L-Xylose +      Inulin —
L-Arabinose +      D-Mannitol +
L-Rhamnose (—)      D-Sorbitol (—)
D-Fructose +      Dulcitol —
D-Galactose +      Mesoinositol (—)
Saccharose +      Salicin +
Maltose +      Sodium acetate +
Lactose +      Sodium citrate (+)
Raffinose +      Sodium succinate +

The symbols mean:

+ good growth and consumption of the source of carbon certain.

(+) weak growth, and consumption of the source of carbon doubtful.

(—) very weak growth, and consumption of the source of carbon improbable.

— no growth, and no consumption of the source of carbon.

The present invention, insofar as it includes the production of angolamycin, is not limited to the use of the above description, but extends to the use of variants of these organisms such, for example, as are obtained by selection or mutation, especially under the action of ultraviolet rays or X-rays or nitrogen mustard oils.

In order to obtain angolamycin a strain of Streptomycetes exhibiting the properties of *Streptomyces eurythermus* is aerobically cultivated in a nutrient aqueous solution containing for example inorganic salts, nitrogenous compounds and if desired carbohydrates, until the solution exhibits a substantial anti-bacterial activity, and the angolamycin is then isolated from the culture filtrate.

The nutrient solution may contain as inorganic salts, for example, chlorides, nitrates, carbonates, sulfates of alkali metals or alkaline earth metals, magnesium, iron, zinc, or manganese. As nitrogenous substances and carbohydrates which may be added if desired, there may be mentioned, for example, aminoacids and mixtures thereof, peptides and proteins and their hydrolysates, such as peptone or tryptone; meat extracts; water-soluble constituents of cereal grains, such as maize or wheat; distillation residues from manufacture of alcohol, or yeasts, beans especially those of soya plants; seeds, for example, those of cotton plants; and also glucose, saccharose, lactose, starches or the like.

The cultivation is carried out aerobically, for example, in a quiescent surface culture or advantageously submerged while agitating or stirring, with air or oxygen in shaking flasks or known fermenters. A suitable temperature is within the range of 20–50° C. In general, the nutrient solution exhibits a substantial anti-bacterial action after 1½ to 5 days.

In order to isolate the antibiotic from the culture filtrate, which has been separated from the mycelium, the following process may be used: The culture filtrate is extracted, advantageously at a pH value above 7.0, with an organic solvent immiscible with water, such as an ester of a lower fatty acid, for example, ethyl acetate or amyl acetate; a chlorinated hydrocarbon, for example, ethylene chloride or methylene chloride or chloroform; a ketone, for example, methyl propyl ketone, methyl amyl ketone or diisobutyl ketone; an alcohol such as a butyl alcohol or an amyl alcohol; or an ether, for example, ethyl ether, diisopropyl ether, dibutyl ether or a glycol ether or the like. Instead of or in addition to extracting the culture filtrate with a solvent purification of the antibiotic may be carried out by adsorption, for example, on active carbon or an activated earth, such as Fuller's earth or floridin, followed by extraction of the adsorbate, for example, with an acid aqueous solution and/or with an organic solvent which is at least partially soluble in water, such as isopropanol, butanol or methyl ethyl ketone. Furthermore, the antibiotic may be precipitated directly from the culture filtrate, for example, in the form of a salt of an organic sulfonic acid or by precipitation with picric acid.

A good method of purifying the new antibiotic consists in distribution between an acid aqueous solution and an organic solvent immiscible with water. Advantageously the distribution is carried out by the countercurrent method in suitable apparatus. Chromatography is also a very suitable method of purification. The pure antibiotic can be obtained in crystalline form, for example, from organic solvents, such as ether, dioxane, mixtures of ether and petroleum ether, mixtures of benzene and ether or mixtures of acetone and petroleum ether. The same solvents may be used for recrystallization or there may be used aqueous-organic solvents, such as dilute alcohols, dilute acetone or the like.

The present invention includes in addition to the production of crystalline angolamycin, the production of its neutral or acid salts with inorganic or organic acids and also the salts themselves, especially angolamycin sulphate, angolamycin hydrochloride, angolamycin acetate and angolamycin pantothenate, and also conversion products thereof obtainable by hydrogenation or oxidation, and furthermore fission products of angolamycin such as are obtained, for example, by hydrolysis.

Angolamycin, its salts, its conversion and fission products referred to above, or mixtures of these substances, can be used as medicaments, for example, in the form of pharmaceutical preparations. Such preparations contain the acitve compound in admixture with pharmaceutical organic or inorganic carriers suitable for enteral, parenteral or local administration. For making the carrier there are used substances which do not react with the new compounds, such, for example, as gelatine, lactose, starches, magnesium, stearate, talc, vegetable oils, benzyl alcohols, gums, polyalkylene glycols, white petroleum jelly, cholesterol or another known carrier for medicaments. The pharmaceutical preparations may be in the form, for example, of tablets, dragees, powder, salves, creams, suppositories or in liquid form as solutions, suspensions or emulsions. If desired they may be sterilized and/or may contain auxiliary substances, such as preserving, stabilizing, wetting or emulsifying agents. They may also contain another therapeutically active substance.

The antibiotic angolamycin can be used not only as a medicament against infections caused by the above mentioned microorganisms but also as disinfectant agent against those microorganisms and as preserving agent, for instance for poultry, for fish and for meat and fish preserves.

This is a continuation-in-part of our copending application Ser. No. 589,574, filed June 6, 1956, now abandoned.

The following example illustrates the invention:

A nutrient solution is prepared which consists of 3 grams of meat extract (commercial product known as Oxo Lab Lemco), 5 grams of peptone, 10 grams of crude glucose, 5 grams of sodium chloride and 10 grams of calcium carbonate in 1 liter of tap water, and its pH value is adjusted to 7.5. This solution or a larger quantity thereof is charged into Erlenmeyer flasks of 500 cc. capacity, (each having a charge of 100 cc. of nutrient solution), or into fermenters of 500 liter capacity (each charged with 300 liters of nutrient solution), and the charges are sterilized under 1 atmosphere gauge pressure for 20–30 minutes. Each charge is then inoculated with up to 10 percent of a partially sporulating vegetative culture of Streptomyces eurythermus (NRRL 2539 or 2540 or 2541) and incubated while stirring or agitating well, and in the fermenters accompanied by aeration (with about 1 part by volume of sterile air for each part by volume of nutrient solution per minute) at 27° C. After growth has occurred for 48 hours, the cultures are filtered with the addition of a filter aid either through a suction filter or a filter press or a rotating filter, depending on the volume of the culture, and the aqueous solution containing the antibiotic is thus freed from mycelium and other solid constituents.

170 liters of the culture filtrate are extracted at a pH value of 8 with 70 liters of ethyl acetate. In this manner the whole activity against gram-positive germs passes into the extract, and the culture filtrate still contains an activity against moulds, especially against Candida tropicalis. The ethyl acetate extract is then extracted by agitation three times with 0.5 N-aqueous acetic acid using 4 liters thereof on each occasion, whereby the whole activity against gram-positive germs passes into the aqueous phase. The acetic acid extract is rendered alkaline with a concentrated solution of sodium carbonate and agitated three times with 2.5 liters of ethyl acetate on each occasion. The bases are then extracted again with a total of 3 liters of 0.5 N-aqueous acetic acid, then liberated with concentrated sodium carbonate solution, and finally extracted by agitation with a total of 1 liter of ethyl acetate. The ethyl acetate solution is washed with water, dried with sodium sulfate and evaporated to dryness in vacuo at 40° C. There remain behind 2.39 grams of a yellowish amorphous product, of which the anti-bacterial activity corresponds closely to that of crystalline angolamycin. The 2.39 grams of crude product so obtained are dissolved in 50 cc. of ether, while gently warming.

The solution is filtered and inoculated with angolamycin. In the course of a few hours, 1.80 grams of the antibiotic separate in the form of crystals melting at 131–134° C. For the purpose of further purification, a solution of the crystals in as small an amount of hot benzene as possible is mixed with 10 times its amount of ether. The crystals of pure antibiotic which then separate melt at 133–136° C., and have the specific rotation $[\alpha]_D^{21} = -64°$ (c.=1.30 in chloroform). By analysis—Found: C=60.21%; H=8.78% N=1.40% $CH_3O$=8.80% $CH_3(N)$=3.66% $CH_3(C)$=11.55% active H=0.52%.

By recrystallization from diisopropyl ether or dioxane the angolamycin is obtained in the form of fine needles melting at 165–168° C. By analysis: Found—C=60.49% H=8.93%, N=1.66%.

Instead of being purified by direct crystallization the crude base may be purified by chromatography. For this purpose 42 milligrams of the crude base are chromatographed over 2 grams of aluminum oxide (activity III according to Brockmann) by fractional elutriation by means of benzene, chloroform and mixtures of chloroform and methanol. With benzene and chloroform only traces of impurities are eluted, whereas the chloroform-methanol (16:1)-fractions contain 40 milligrams of the pure antibiotic. The latter is crystallized in the manner described above.

The crude bases can also be purified by the countercurrent distribution method using, for example, the following solvent systems:

(a) MacIlvaine buffer (pH 3.15) and chloroform 1:1;
(b) Isopropyl-ether (12 parts by volume) acetone (10 parts by volume)-water (10 parts by volume).

In a 100-stage distribution the substance and activity maximum in the system (a) is found at stage No. 72 and with the system (b) at stage No. 55.

Preparation of the reineckate: A solution of 60 milligrams of angolamycin in 1 cc. of methanol is slowly precipitated with 15 cc. of an ethereal solution of reinecke acid (prepared as described by Karrer and Schmid), Helvetica Chimica Acta, vol. 29, page 1853 (1946)). The precipitate is dissolved in methanol and precipitated by the addition of ether.

By analysis — Found: Cr=3.96%. Calculated for $C_{54}H_{96}O_{18}N_7S_4Cr$: Cr=3.97%.

Instead of the reineckate, salts of other acids may be prepared, especially, with sulfuric acids, hydrochloric acid, acetic acid or pantothenic acid.

Acid hydrolysis of angolamycin: 18 milligrams of angolamycin are heated in 2 cc. of 0.5 N-sulfuric acid in a sealed tube for 5 hours at 100° C. The reaction mixture is then extracted twice by agitation with ethyl acetate, whereupon the aqueous phase is given a pH value of 5 by the addition of barium hydroxide solution. The precipitated barium sulfate is removed by centrifuging, and the clear supernatant liquid is evaporated to dryness in vacuo. The residue is tested by paper chromatography a mixture of butanol and glacial acetic acid (10:1) saturated with water being used. By means of ammoniacal silver nitrate solution and heating to 100° C. for 5 to 10 minutes, two reducing substances (sugar) are rendered visible on the paper strips, which substances have $R_f$-values of 0.28 and 0.65.

Under the same conditions erythromycin yields 2 reducing substances having $R_f$ values of 0.23 and 0.32 whereas from picromycin and narbomycin only one reducing fission product ($R_f$ 0.23) is obtained.

Hydrogenation of angolamycin:

(a) A solution of 20 mg. of angolamycin in 5 cc. of absolute alcohol is shaken for 2 hours with 10 mg. of a palladium catalyst in an atmosphere of hydrogen. The solution is then filtered and evaporated in vacuo. The dihydroangolamycin is obtained in the form of an antibiotically active, colorless powder. Its double bond number is 1.17. It melts, crystallized from isopropyl ether, at 124–126° C. The IR-spectrum in heavy paraffin oil ("Nujol") is represented in FIG. 2 the IR-spectrum in potassium bromide in FIG. 3.

(b) A solution of 20 mg. of angolamycin in 5 cc. of glacial acetic acid is shaken for 1 hour with 10 mg. of a platinum catalyst in an atmosphere of hydrogen. The solution is then filtered and evaporated in vacuo. The hexahydro-angolamycin is obtained in the form of an antibiotically active, colorless powder. Its double bond number is 3.0.

What is claimed is:

1. An antibiotic substance selected from the group consisting of angolamycin, a basic crystalline substance, soluble in alcohols, esters, ketones, ethers and chlorinated hydrocarbons, slightly soluble in water and petroleum ether, being capable of forming salts with acids which are soluble in water, melting at 133–136° C., when crystallized from benzene-ether, and at 165–168° C. when crystallized from di-isopropylether, exhibiting in the UV spectrum a maximum at 240 mμ (log ε=4.16 in ethanol) and when taken up in mineral oil showing in the IR spectrum bands at 2.93μ, 3.53μ (mineral oil), 5.84μ, 5.92μ, 6.15μ, 6.81μ (mineral oil), 7.06μ, 7.25μ (mineral oil), 7.59μ, 7.69μ, 7.87μ, 8.00μ, 8.16μ, 8.44μ, 8.56μ, 8.95μ, 9.16μ, 9.27μ, 9.34μ, 10.02μ, 10.29μ, 10.70μ, 11.00μ, 11.38μ, 11.91μ, 12.32μ, 12.66μ, 13.20μ and 13.90μ (mineral oil), having an optical rotation $[\alpha]_D^{21} = -64°$ (c.=1.30 in chloroform) and a pK value of 6.74 when dissolved in methylcellosolve-water (80:20), taking up one molecular proportion of hydrogen when hydrogenated with a palladium catalyst, to yield dihydro-angolamycin of melting point 124–126° C. (from isopropylether), and 3 molecular proportions when hydrogenated with a platinum catalyst in glacial acetic acid and yielding on acid hydrolysis two reducing substances having $R_f$ values of 0.28 and 0.65, in 10:1 (vol.) mixture of butanol and glacial acetic acid saturated with water, the dihydro angolamycin, the hexahydro angolamycin and the salts of these substances said angolamycin having been prepared by the process of claim 10.

2. Angolamycin, a crystalline antibiotic substance, soluble in alcohols, esters, ketones, ethers and chlorinated hydrocarbons, slightly soluble in water and petroleum ether, being capable of forming salts with acids which are soluble in water, melting at 133–136° C., when crystallized from benzene-ether and at 165–168° C. when crystallized from di-isopropylether, exhibiting in the UV spectrum a maximum at 240 mμ (log ε=4.16 in ethanol) and when taken up in mineral oil showing in the IR spectrum bands at 2.93μ, 3.53μ (mineral oil), 5.84μ, 5.92μ, 6.15μ, 6.81μ (mineral oil), 7.06μ, 7.25μ (mineral oil), 7.59μ, 7.69μ, 7.87μ, 8.00μ, 8.16μ, 8.44μ, 8.56μ, 8.95μ, 9.16μ, 9.27μ, 9.34μ, 10.02μ, 10.29μ, 10.70μ, 11.00μ, 11.38μ, 11.91μ, 12.32μ, 12.66μ, 13.20μ and 13.90μ (mineral oil), having an optical rotation $[\alpha]_D^{21} = -64°$ (c.=1.30 in chloroform) and a pK value of 6.74 when dissolved in methylcellosolve-water (80:20), taking up one molecular proportion of hydrogen when hydrogenated with a palladium catalyst to form the dihydro-product and 3 molecular proportions when hydrogenated with a platinum catalyst in glacial acetic acid to form the hexahydro-product and yielding on acid hydrolysis two reducing substances having $R_f$ values of 0.28 and 0.65, in a 10:1 (vol.) mixture of butanol and glacial acetic acid saturated with water said angolamycin having been prepared by the process of claim 10.

3. An acid salt of the crystalline substance defined in claim 2.

4. The dihydro-product of the substance defined in claim 2.

5. The hexahydro-product of the crystalline substance defined in claim 2.

6. A sulfate of the substance defined in claim 2.

7. The hydrochloride of the substance defined in claim 2.

8. The acetate of the substance defined in claim 2.

9. The pantothenate of the substance defined in claim 2.

10. A method for producing the crystalline antibiotic angolamycin which comprises cultivating a Streptomyces strain of the species selected from the group consisting of *eurythermus* NRRL 2539, *eurythermus* NRRL 2540, and *eurythermus* NRRL 2541, in an aqueous nutrient medium containing a source of carbon and of organic nitrogen and inorganic salts under aerobic conditions at 20–50° C. until the nutrient medium exhibits a substantially antibacterial activity, and then isolating the antibiotic angolamycin from the culture filtrate.

11. A method for producing the crystalline antibiotic angolamycin which comprises cultivating a Streptomyces strain of the species selected from the group consisting of *eurythermus* NRRL 2539, *eurythermus* NRRL 2540, and *eurythermus* NRRL 2541, in an aqueous nutrient medium containing a source of carbon and of organic nitrogen and inorganic salts under aerobic conditions at 20–50° C. until the nutrient medium exhibits a substantial antibacterial activity, isolating the antibiotic angolamycin from the culture filtrate, and forming an acid salt thereof.

12. A method which comprises cultivating a Streptomyces strain of the species selected from the group consisting of *eurythermus* NRRL 2539, *eurythermus* NRRL 2540, and *eurythermus* NRRL 2541, in an aqueous nutrient medium containing a source of carbon and of organic nitrogen and inorganic salts under aerobic conditions at 20–50° C. until the nutrient medium exhibits a substantial antibacterial activity, isolating the antibiotic angolamycin from the culture filtrate, and reducing the angolamycin with hydrogen.

13. A method which comprises cultivating a Streptomyces strain of the species selected from the group consisting of *eurythermus* NRRL 2539, *eurythermus* NRRL 2540, and *eurythermus* NRRL 2541, in an aqueous nutrient medium containing a source of carbon and of organic nitrogen and inorganic salts under aerobic conditions at 20–50° C. until the nutrient medium exhibits a substantial antibacterial activity, isolating the antibiotic angolamycin from the culture filtrate and hydrogenating it in the presence of a palladium catalyst until one molecule of hydrogen has been taken up.

14. A method which comprises cultivating a Streptomyces strain of the species selected from the group consisting of *eurythermus* NRRL 2539, *eurythermus*

NRRL 2540, and *eurythermus* NRRL 2541, in an aqueous nutrient medium containing a source of carbon and of organic nitrogen and inorganic salts under aerobic conditions at 20–50° C. until the nutrient medium exhibits a substantial antibacterial activity, isolating the antibiotic angolamycin from the culture filtrate, and hydrogenating it in glacial acetic acid and in the presence of a platinum catalyst until 3 molecules of hydrogen have been consumed.

No references cited.